Patented Dec. 6, 1938

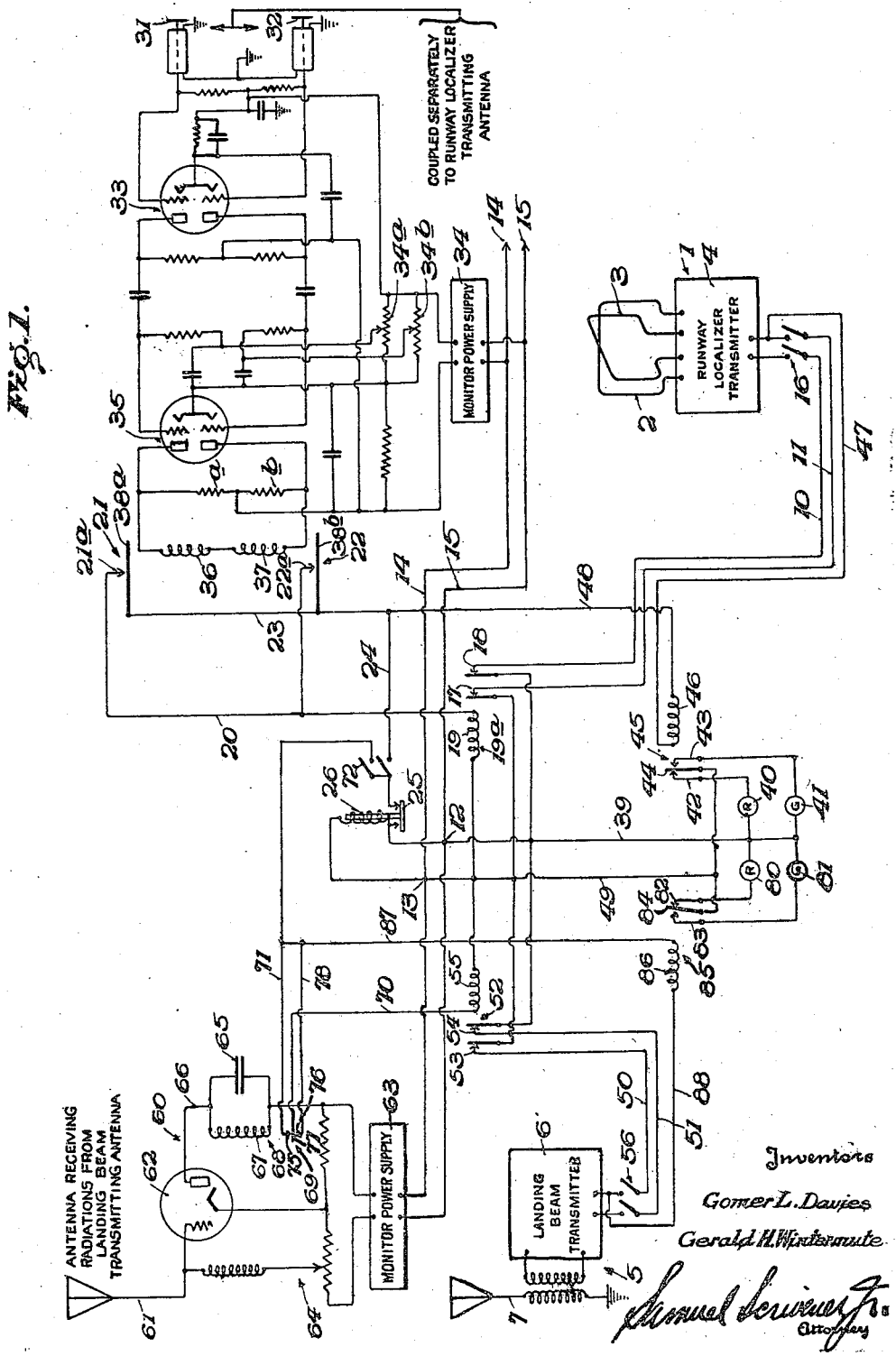

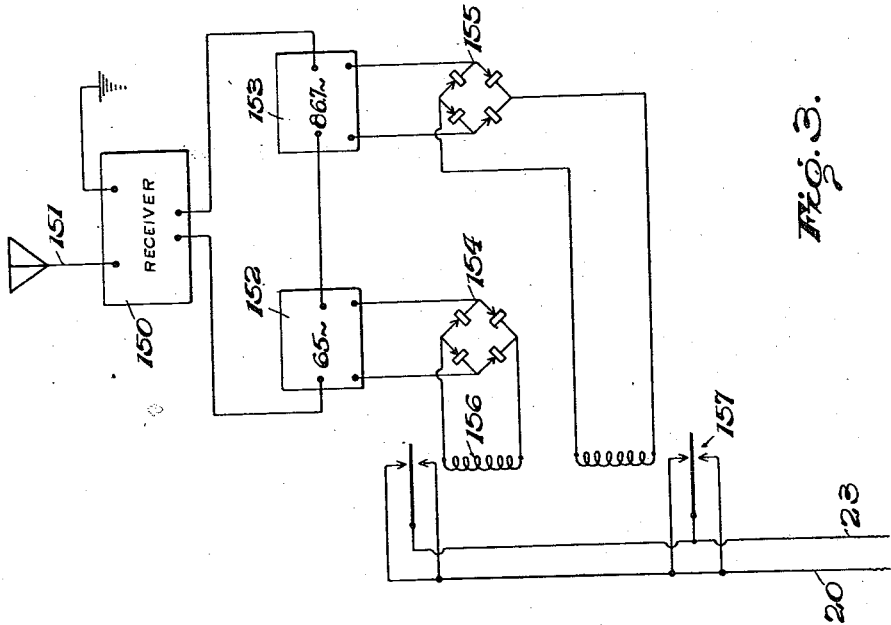
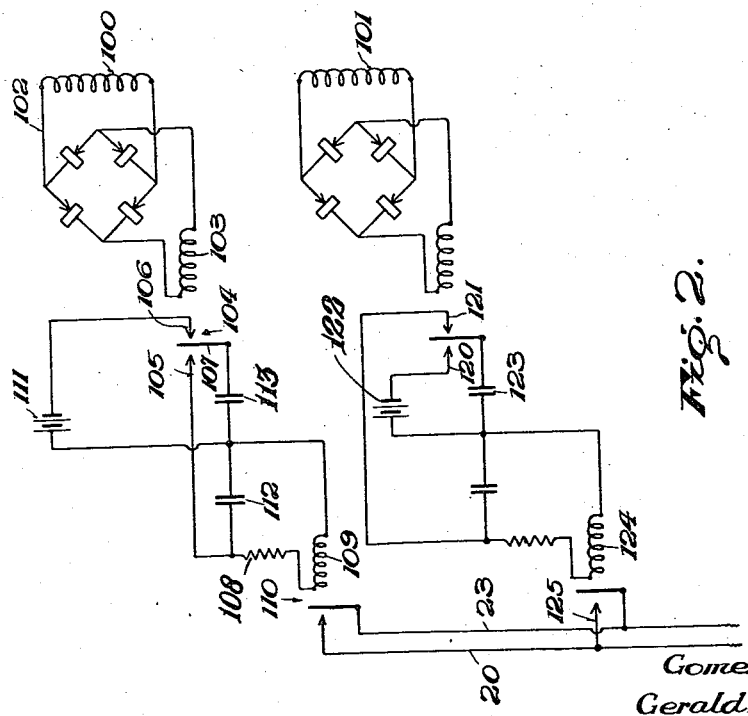

2,139,061

UNITED STATES PATENT OFFICE 2,139,061

CONTROL MEANS FOR RADIO LANDING SYSTEMS

Gerald H. Wintermute, Newton, N. J., and Gomer L. Davies, Cleveland, Ohio, assignors to Washington Institute of Technology, Inc., Washingington, D. C., a corporation of Delaware Application July 29, 1936, Serial No. 93,280

17 Claims. (Cl. 250—11)

This invention relates to radio landing systems for aircraft, of the type employing a localizing beacon for guiding the landing aircraft toward a pre-determined area on the ground, such as an airport runway, and a landing beam which provides an upwardly-curved path in space having its origin above, below or in the ground surface and at the end or in the prolongation of the runway, and which provides a path to ground for the landing aircraft.

More particularly, the invention relates to a means for controlling the operation of the transmitters which set up the various radiation fields which define or create the paths forming the landing system, so that if the spatial or directional characteristics of the paths vary or change so that an incorrect path to ground is defined thereby, the transmitter involved will be deenergized. The importance of such a control means to an effective and useful landing system will be evident when it is considered that, in periods of low visibility or no visibility and in making blind landings, the pilot of an aircraft which is landing with the aid of the system, must rely entirely upon instrument indications of the position of the aircraft with respect to the various paths of the landing system in bringing the plane to earth. These indications show the lateral position of the plane with respect to the airport runway and the position of the plane with respect to the curved landing beam, and in the proper landing of the plane, under the conditions referred to, the pilot must rely upon the proper shape and direction of the paths of the system. Obviously, if the landing beam, for example, provides an improper path to ground, a situation of great danger to the landing aircraft and persons thereon is created. However, under the conditions referred to, the pilot has no means of knowing whether the operation of the system is such as to provide a proper path to ground and must assume that such is the case if the aircraft instruments show the various beams of the landing system to be in operation. In the event that, for any reason, the path to ground provided by the landing system is incorrect or out of place it will be preferable to de-energize that part of the system which is not operating properly, in order that if the aircraft instruments show that the landing system is operating, the pilot will know absolutely that the operation thereof is correct and that by properly following his instrument indications he will cause his plane to follow a correct path to ground. Further, it is imperative that the operator of the landing system be warned when the transmitting station is de-energized or is operating improperly in order that he may make the necessary adjustments or repairs, and may advise the pilot of the landing aircraft by radio or other means that one or more elements of the landing system is not operating, in order that the pilot of the landing aircraft may know the operating condition of the ground equipment and will know what indications to expect.

It is therefore the object of this invention to provide means for monitoring or controlling the various radiation fields of an aircraft landing system in such a manner that if, for any reason whatsoever, the operation of the system is not such as to provide a correct and predetermined path to ground, the operation of the affected transmitting means which sets up the improper radiation field will be stopped, in order that a correct path to ground or none at all will be provided by the system.

Another object is to provide means for indicating at the transmitting point or at any remote station, the condition of energization or de-energization of the various transmitters of the system.

Other objects and features of novelty will be apparent from the following description and the annexed drawings, wherein is disclosed a system according to the present invention. It is to be understood, however, that the invention is in no way limited by such description and drawings or otherwise than by the appended claims.

Figure 1 of the drawings shows diagrammatically the connections and elements of parts of the landing system and the control means therefor according to one form which the present invention may take;

Figure 2 of the drawings discloses an alternative form of relay control means which may be employed, and Figure 3 discloses a system which may be employed for remote operation of the monitor system.

Radio landing systems of the type illustrated in connection with the present application comprise two principal guiding means, these being a runway localizing beam for guiding the aircraft to the proper airport runway, and a landing beam which provides an upwardly curved path having its origin at the transmitting antenna which is on or adjacent to the ground surface and which beam defines a proper path to ground for the descending aircraft. Both of these means are adapted to be controlled by the control means according to the present invention. The landing system also includes one or more marker beacons for providing an indication in the landing aircraft of the position of the aircraft with respect to the edge of the landing field, and such marker beacons may be controlled within the broad scope of the present invention.

The runway localizing beacon which forms part of the system described above is defined by the intersecting area of two electric fields set up by the radiations from two antennas arranged on the ground. Preferably, the antennas are so energized as to radiate two overlapping fields each having a figure-of-eight radiation pattern, although intersecting cardioid field patterns may be employed if desired. The two fields are preferably radiated at equal carrier frequencies and the carrier radiated from each antenna is given a characteristic modulation in order to distinguish between the two radiated fields. It will be seen that in the overlapping area the modulations impressed upon the radiation fields from the two antennas will be equal and that this equi-signal zone will have directional characteristics and may therefore be employed as a guide or beacon. The radiation fields of the two antennas may be modulated by alternate non-continuous signals such as the A and N or A and I signals for providing an aural indication in the aircraft, or characteristic continuous modulations may be impressed on the two radiated carriers, in the manner first disclosed by T. E. Brockstedt in Patent No. 1,865,826. The latter type of modulation is usually employed when a visual type of aircraft signal is desired, although the A and N or A and I signals may be converted to visual indications in the plane if desired.

The transmitting means for setting up the radiation fields defining the runway localizer beacon are shown generally at 1 in Fig. 1 of the drawings. This transmitting means comprises a directive antenna array, the two crossed loop antennas 2, 3 being disclosed in the system illustrated in Fig. 1, each of these being supplied with characteristically modulated carrier from transmitter 4. In the preferred operation of the system the antenna 2 is supplied with radio frequency current modulated at a continuous audio frequency of 65 cycles, while the antenna 3 is supplied with radio frequency current modulated at a continuous audio frequency of 86.7 cycles. The radiation fields produced by the antennas 2 and 3 are directional and are preferably of figure-of-eight form and intersect or overlap each other to provide an equi-signal zone which may be aligned with the airport runway and which defines the directional course for the aircraft to follow.

The means for establishing a line of constant field intensity in space, defining a path to ground along which the aircraft may descend, is shown generally at 5 in the drawings and constitutes a transmitter 6 which supplies an antenna 7 with suitably modulated radio frequency current. It will be understood that the specific means or circuits for establishing either the runway localizer beacon or the landing beam form no part of the present invention and that any suitable means for establishing these elements of the landing system may be employed without departing from the present invention.

The runway localizer transmitter is supplied with power through leads, 10, 11 which are connected at 12 and 13 respectively, to main power lines 14, 15 which may be connected to a source of power through a linestarter switch, not shown.

A control switch 16 is inserted in the leads 10, 11 adjacent the transmitter 4 to provide a manual control for such transmitter without affecting other parts of the system. Included in the leads 10, 11 are also two relay contacts 17, 18, which form part of a relay 19 and each of which may be operated to open position by means of the solenoid 19a of the relay to thereby open the circuit energizing the transmitter 4. One terminal of the solenoid 19a is connected to power supply line 14 at point 13, while the other terminal of the winding may be connected to supply line 15 through lead 20, either of relay contacts 21a or 22a of relays 21 and 22, lead 23, lead 24, switch 72 and the armature 25 of a time-delay relay 26. The relays 21 and 22 are normally so energized during the operation of the system that the relay contacts 21a and 22a are open, as will be described more fully hereinafter, and the circuit through winding 19a will consequently be normally open, thereby normally maintaining relay contacts 17 and 18 closed and permitting the supply of power to transmitter 4.

The winding of the time-delay relay 26 is connected directly across the supply lines 14, 15 so that the relay will be energized a pre-determined time after power is connected to main power lines 14 and 15, thereby causing the armature 25 of the relay to connect the lead 24 to supply line 15.

The manually operable switch 72 is provided for disconnecting the monitoring system from the power supply and de-energizing the same, without affecting the transmitters or the signal means.

The relay 21 comprises, in addition to the solenoid 36, the contacts 21a which are controlled by the solenoid. The relay 21 is normally so adjusted that the movable contact 38a thereof is held out of contact with fixed contact 21a by current in winding 36 but is adapted and adjusted to move into engagement with contact 21a upon decrease of the current in winding 36 below a predetermined value. The relay 22 which includes the winding 37, comprises also the fixed contact 22a and the movable contact 38b. The arrangement of this relay is such that upon increase of the current in winding 37 above a predetermined value the movable contact 38b will engage contact 22a.

Means are provided by the invention for controlling the relay 19 and for causing the same to be normally de-energized whereby the supply of current to transmitter 4 will normally be uninterrupted, such means being operable to permit continued operation of the transmitter so long as the radiation fields produced by the antennas 2, 3 are such as to establish an equi-signal zone defining a pre-determined path in a proper position and direction with respect to the landing field. Such means are illustrated in the drawings and comprise the two plates 31, 32 which are arranged locally with respect to the loops 2, 3 respectively and each of which is capacitatively coupled to one of the loops to receive radiations therefrom. If desired, coils inductively coupled to the loops 2, 3 may be employed in place of the plates 31, 32. The plates 31, 32 are connected to the two grids of a detector tube 33, which receives power from a monitor supply unit 34 which is connected to the main power supply lines 14, 15. The detected currents delivered by the two plate circuits of tube 33 are supplied to the grids of a rectifier tube 35 which is also supplied with power from the monitor power supply 34. The bias voltages of the grids of tube 35 are independently variable by means of potentiometers 34a and 34b.

In the normal operation of the beacon, audio frequency voltages, of frequencies equal respectively to the two radiated modulation frequencies, are supplied to the grids of tube 35, and the currents taken by the plates of tube 35 will be controlled by these grid voltages. It will be seen that if the currents taken by each of the plates of tube 35 should be equal the voltage drops across the equal resistors $a$ and $b$ will be equal and both plates of tube 35 will be at the same potential and no current will flow through the series-connected windings 36, 37 of the relays 21, 22 which are connected across the plates of tube 35. In the operation of the system the potentiometers $34a$ and $34b$ are so adjusted that the plates of tube 35 will not take equal currents. When this condition obtains a potential difference will exist between the two plates of tube 35 and a current will flow through the relay coils 36 and 37. Relay 21 is adjusted to operate on a slightly lower current than relay 22. With normal and proper beacon operation the unbalance of tube 35 is so adjusted that relay 21 operates, thereby opening contacts $21a$, while the unbalance is insufficient to operate relay 22. In the event of any variation in the currents in antennas 2, 3, the degree of unbalance of tube 35 will change. If the change is such that more current flows through coils 36, 37 the relay 22 will operate, closing contacts $22a$, while if the change is such that less current flows in the coils, the relay 21 will release, thereby closing contacts $21a$.

Each of the contacts $21a$, $22a$ is connected to one terminal of winding $19a$ of relay 19 through lead 20 while the movable contacts $38a$ and $38b$ are both connected to main power supply line 15 through leads 23 and 24, and armature 25 of the time-delay relay 26.

It will be seen that so long as the energy introduced into the plates 31 and 32 due to capacity coupling between the plates and the transmitting antennas 2, 3 respectively does not decrease or increase above or below pre-determined limits the movable contact members $38a$ and $38b$ will be maintained out of engagement with fixed contact members $21a$ and $22a$ and the circuit through winding $19a$ of relay 19 will therefore be open, de-energizing the relay 19 and permitting the relay contacts 17, 18 to pass current from the power supply lines to transmitter 4.

Inasmuch as the field pattern of the radiation from either of the antennas 2, 3 and the position and direction of the equi-signal zone are functions of the current flow in the antennas, it will be seen that any increase or decrease of the current in one of the antennas 2, 3, or total de-energization of one of the antennas will cause the course defined by the radiation fields of the antennas to shift from the predetermined position to a position giving an improper directional indication to a landing aircraft. For this reason, it is preferable to completely de-energize the affected transmitter when either of the radiation fields of the antennas 2, 3 varies from the predetermined shape.

When the current in the windings 36, 37 decreases below a predetermined value by reason of the change of the potential difference between the plates of tube 35, the relay contact $21a$ will be closed by release of the movable contact $38a$ and the above-described circuit through relay 19 will be completed and relay contacts 17, 18 will be opened, thereby disconnecting transmitter 4 from the main supply lines 14, 15 and de-energizing the transmitter. Further, when the current in the windings 36, 37 increases above a predetermined value, due to a change of the potential difference between the plates of tube 35, the relay contact $22a$ will be closed by movement of the movable contact $38b$ and the above-described circuit through relay 19 will be completed and relay contacts 17, 18 will be opened, thereby disconnecting the transmitter 4 from the power supply lines 14, 15. The relay contacts 17, 18 will not be returned to closed position to permit operation of the transmitter until manually re-set. By reason of the above-described operation it will be seen that transmitter 4 will operate to provide radiation fields defining a runway-localizing equisignal zone or beacon only when the radiated fields from antennas 2, 3 are such as to provide the predetermined path.

Means are provided by the invention for indicating when the runway localizer transmitter is connected to the main power lines 14, 15 through relay contacts 17, 18 and when the monitor system therefor is operating properly. Such means comprise a signal 40 for indicating that the monitor system for the runway localizer transmitter has not yet gone into operation or that the transmitter 4 has been disconnected from the source of power. This signal may be either aural or visual in type but is preferably a red visual signal. The signal system also includes a signal 41 which is preferably a green visual signal and which, when energized, indicates that the monitor system for the runway localizer transmitter is operating properly and that such transmitter is connected to the source of power and is operating in a proper predetermined manner. One terminal of each of the signals 40 and 41 is connected by lead 39 to main power supply line at point 12. The other terminals of signals 40 and 41 are connected respectively to two fixed spaced contacts 42, 43 between which and movable into engagement with either is a movable contact 44. The movable contact 44 is normally in engagement with fixed contact 42 of the red signal 40 but is adapted to be moved into engagement with fixed contact 43 of green signal 41 upon energization of the solenoid of a relay denoted generally at 45, and which is provided to control the movement of contact member 44.

The relay 45 comprises the winding 46, one terminal of which is connected to main power supply line 14, through lead 47, lead 11, relay contact 17 and connection 13. The other terminal of winding 46 is connected to main power supply line 15 through lead 48, lead 24, and armature 25 of time-delay relay 26.

It will be seen that if the switch 16 is closed, the connection of main power supply lines 14, 15 to a source of electric energy will cause the transmitter 4 to be energized and will also supply current to red signal 40 through lead 49, movable contact 44, and fixed contact 42, thereby energizing the red signal and indicating that the monitor system for the runway localizer transmitter is not yet operating. After a predetermined interval following the connection of main power supply lines to the source of energy, the time-delay relay 26 will operate, and the armature 25 thereof will move to connect lead 24 to main power supply line 15. If the radiations from transmitter 4 are proper and define a predetermined path, so that the relay 19 is de-energized, and if the switch 16 is closed, the operation of the time-delay relay 26 will connect the winding 46 of relay 45 across the main power supply lines 14, 15, thereby energizing the relay and causing movable contact 44 to move out of engagement with fixed contact 42 and into engagement with fixed contact 43. The red signal 40 will accordingly be de-energized and the green signal 41 will be operated to indicate that the transmitter 4 is operating properly and in a predetermined manner and that the monitoring system is operating properly to control the operation of the transmitter. So long as proper, predetermined conditions of the radiations from antennas 2, 3 are maintained, and so long as the monitoring system operates properly, the circuit through relay 45 will remain energized and the green signal 41 will be operated.

When, by operation of manual switch 16 or by automatic opening of relay contact 17 by relay 19, the transmitter is disconnected from the main power supply lines, the circuit through winding 46 of relay 45 will be broken and the movable contact member will move from contact with relay contact 43, thereby de-energizing the green signal 41, and will move into contact with the relay contact 42, thereby energizing the red signal 40 and indicating that transmitter 4 is disconnected from the power supply and that radiation from antennas 2, 3 has been discontinued.

As set forth hereinbefore the landing system comprises, in addition to the runway localizing beacon, an upwardly curved path in space having its origin at the ground and being constituted by a line of constant field intensity in the field radiated from a transmitter located on or adjacent to the surface of the ground. The means for setting up this radiated field is denoted generally at 5 in the drawing and comprises a transmitter 6 which supplies properly modulated radio frequency current to an antenna 7. The transmitter 6 is connected to the main power supply lines 14, 15 through leads 50 and 51 respectively, the lead 50 being connected to main power supply line 14 at point 13 and the lead 51 being connected to the main power supply line 15 at point 12. A relay 52 is provided for controlling the connection of transmitter 6 to the main power supply lines and such relay includes the contact members 53 and 54 which are included respectively in the leads 50 and 51 and which are operable by the solenoid 55 of the relay 52 to open or close the circuit to the transmitter 6. A manually operable switch 56 is also included in the circuit to the transmitter 6 for the purpose of manually controlling the operation of the transmitter. The relay contacts 53, 54 are normally closed, thereby permitting the supply of power to the transmitter 6 and these switches are adapted to be opened upon energization of relay 52 in order to disconnect the transmitter 6 from the power supply lines.

The means for controlling the energization of relay 52, and thereby controlling the supply of current from the power supply lines to the transmitter 6 comprises the monitoring system denoted generally at 60 in the drawings. This monitoring system comprises an antenna 61 which is disposed in such relation to the transmitting antenna 7 that it receives energy therefrom when the transmitter is energized. Current received by antenna 61 is supplied to the grid of a vacuum tube rectifier 62. A monitor power supply unit 63 is connected across the main supply lines 14, 15 and the output of the power supply unit is adapted to provide grid bias current to the tube 62 through potentiometer 64. The monitor power supply unit 63 also supplies power to the cathode and plate circuit of the rectifier tube. The output circuit of the tube is connected by lead 66 to the winding 67 of a relay denoted generally at 68, such relay including contacts denoted generally by numeral 69. A condenser 65 is provided in the output or plate circuit of the tube to by-pass the alternating current component of the output of the tube. The relay contacts 69 preferably comprises two fixed spaced contact members 75 and 76, both of which are connected to main power supply line 15 through leads 71 and 78 respectively, switch 72 and armature 25 of time-delay relay 26. Between the fixed contacts 75 and 76 and adapted to engage either of them is a movable contact member 77 the movement of which is controlled by the relay 68. The movable contact member 77 is connected by lead 70 to one terminal of the winding 55 of relay 52, the other terminal of the winding being connected to main power supply line 14 at point 13. The arrangement of the relay 68 and the contacts is such that relay contact members 76 and 77 are normally held apart by relay 68 and are adapted to be closed by some means, such as a spring, when the current in winding 67 of relay 68 falls below a pre-determined value. The switch members 75, 77 are normally held apart by some means, such as a spring, and are adapted to be closed by relay 68 when the current in winding 67 exceeds a predetermined value.

The operation of the monitoring system 60 is such that the modulated carrier radiated by antenna 7 is received by antenna 61 and rectified by tube 62. The alternating current component of the carrier output of the tube is by-passed through condenser 65, while the direct current component of the carrier output of the tube flows through the winding 67 of sensitive relay 68. The potentiometer 64 may be adjusted so that the grid bias on the vacuum tube is slightly less than that required for plate current cut-off with a definite carrier amplitude. The realy 67 will therefore hold the movable contact member 77 in such position that it does not engage either of the fixed contact members 75 or 76, this being the normal operation of the monitoring system 60 during proper predetermined operation of the transmitter 6.

So long as the contacts of relay 69 are maintained in open position, as described, the circuit through winding 55 of relay 52 will be open and the relay contacts 53, 54 will therefore remain closed in order to permit the supply of current from main power supply lines 14, 15 to transmitter 6. This condition will obtain so long as the current received by antenna 61 does not fall below or exceed predetermined minimum and maximum values and which condition will exist so long as the transmitter 6 is supplying a proper predetermined amount of current to antenna 7. When, for any reason, the supply of current to antenna 7 falls below a predetermined minimum or exceeds a predetermined maximum value, the antenna 61 will receive an improper amount of energy and the supply of current to winding 67 of relay 68 will increase or decrease above or below the predetermined limits, thereby permitting one of the relay contacts 69 to close. When this occurs the winding 55 of relay 52 will be connected across the main power supply lines 14, 15, the relay 52 will be operated and the relay contacts 53, 54 will be opened, thereby disconnecting the transmitter 6 from the main power supply line 14, 15. In will be seen that due to such operation the field radiated by antenna 7 will be proper for providing a path to ground at all times when the transmitter is operating and that when the radiated field from antenna 7 provides an improper path to ground the transmitter 6 will be automatically de-energized.

Means are provided by the present invention for indicating the condition of energization or de-energization of transmitter 6 and such means comprises the signal 80, which is preferably a red visual signal for indicating that the transmitter or the monitoring system therefor is not operating and the signal 81, which is preferably a green visual signal, for indicating that the transmitter is properly energized and that the monitoring system therefor is functioning. One terminal of each of signals 80 and 81 is connected by lead 39 to main power supply line 15 at point 12. The other terminals of signals 80 and 81 are connected respectively to two fixed spaced contact members 82 and 83. Between contacts 82 and 83 is arranged a movable contact member 84 which is connected to main power supply line 14 through lead 49 and which normally engages red signal contact 82 but which is movable into engagement with either of contact members 82 or 83. The movable contact member 84 comprises one element of a relay 85 which includes also the winding or solenoid 86 which, when energized, operates the movable contact 84 into engagement with green signal contact 83. One terminal of winding 86 is connected through lead 87, switch 72 and armature 25 of time-delay relay 26 to the main power supply line 15 at point 12. The other terminal of winding 86 is connected through lead 88, lead 50 and switch 53 to the main power supply line 14 at point 13.

It will be seen that, if the switch 56 is closed, current will be supplied to transmitter 6 when the main power supply lines 14, 15 are connected to a source of electric energy. Simultaneously, the red signal 80 will be energized, due to the fact that movable contact 84 is normally in engagement with fixed contact 82 and the circuit through relay 85 is not yet completed by operation of time-delay relay 26. The energization of the red signal 80 at this time indicates that the monitoring system is not yet operating to control transmitter 6. After a predetermined interval following the connection of lines 14, 15 to power, the time-delay relay 26 will operate, thereby connecting lead 87 to power line 14 through switch 72 and armature 25 and thereby energizing relay 85. Movable contact 84 will now be moved out of engagement with red signal contact 82 and into engagement with green signal contact 85, thereby energizing the green signal 81 to indicate that the transmitter 6 and the monitor therefor are operating properly.

Any de-energization of transmitter 6, such as by automatic operation of relay 52 because of improper radiation from antenna 7, or by manual operation of switch 56, will break the circuit through relay 85, thereby causing movable contact 84 to move from engagement with green signal contact 83 into engagement with red signal contact 82, to thereby indicate that the transmitter 6 is de-energized or that the monitor therefor is not functioning properly.

In the operation of the above described system, when power is connected to the lines 14, 15 and the switch 16 is closed the transmitter 4 will supply modulated carrier to the antennas 2, 3 and the radiation fields of these antennas will overlap to define an equi-signal zone providing a runway localizing beacon. The plates 31, 32 which are respectively arranged locally and capacitatively with respect to the antennas 2, 3, will receive energy from the radiations from antennas 2, 3 and will supply current to the circuits connected to relays 21, 22. So long as the energy supplied to plates 31, 32 due to the radiated fields of antennas 2, 3 does not fall below or exceed certain predetermined values the relays 21, 22 will maintain the contacts 21a, 22a open thereby de-energizing the winding 19 and permitting the switches 17, 18 to remain closed. In this condition current will be supplied to transmitter 4 from the main power supply line 14, 15 and the green signal 41 will be energized to show that the transmitter 4 is operating properly. When the energy introduced into either or both of plates 31, 32 falls below a predetermined value the relay 21 will operate to release contact 21a thereby causing relay 19 to be energized to open contacts 17, 18 and disconnect the transmitter 4 from the main power supply lines. When the energy introduced into either or both of the plates 31, 32 exceeds a predetermined value, the relay 22 will be so operated as to close contact 22b, thereby energizing relay 19 and causing contacts 17, 18 to be opened, to disconnect the transmitter 4 from the power supply lines. In either of these events the circuit through relay 45 will be opened and the red signal 40 will be operated to indicate that the transmitter 4 is not operating.

With respect to the landing beam control system it will be seen that when the contacts 53, 54 and 56 are closed power will be supplied to the transmitter 6 and the antenna 7 will be energized thereby to provide a radiation field defining a line of constant field intensity in space providing a path to earth. The antenna 61, being disposed in the radiated field of antenna 7 will supply to the tube 62 currents proportional to the radiation field of antenna 7. The output of tube 62 will therefore energize relay 68 in such a manner as to normally hold relay 69 in open position, thereby disconnecting winding 55 of relay 52 from the power supply lines and thereby permitting the contacts 53, 54 to remain closed whereby the transmitter 6 is connected to the main power supply lines. When the radiation field of antenna 7 falls below a predetermined value the currents supplied to the tube 62 by antenna 61 will decrease in such an amount that the output of tube 62 will be insufficient to permit the relay 68 to hold switch 69 in open position and the movable contact 77 will move into engagement with contact 76, thereby connecting winding 55 of relay 52 to the main power supply lines. When the radiated field of antenna 7 exceeds a predetermined value, the output of tube 62 will increase to such an extent as to move the contact member 77 into engagement with the fixed contact 75, thereby energizing relay 52. When the relay 52 is energized the contacts 53, 54 will be opened thereby disconnecting transmitter 6 from the main power supply lines. At the same time the circuit through winding 86 of relay 85 will be broken and the green signal 81 will be de-energized, while the red signal 80 will be operated to indicate that the transmitter 6 is not operating.

From the above description of the construction and operation of the system according to this invention, it will be seen that there has been provided means for insuring that the operation and disposition of the elements of the landing system are proper to afford a correct path along the runway and a correct curved path to ground, along both of which a landing aircraft may travel in order to descend to ground. Inasmuch as the transmitter will be de-energized in the event of improper paths being set up by the radiations from the antennas energized by the transmitter, it will be apparent that the pilot of a landing aircraft, knowing this, may safely assume that by following the instrument indications in the aircraft he will follow a correct path to ground and may safely land the aircraft.

It will be apparent that different types of relays other than those illustrated in Fig. 1 may be employed, and that relays of the type illustrated at 21, 22 in Fig. 1 may be used in place of that illustrated at 69, and vice versa.

The monitoring system disclosed hereinbefore and illustrated in Fig. 1 of the drawings is particularly, but not exclusively, adapted to the control of beacons of the visual or double-modulation type, in which two continuous, characteristic radiations are transmitted. If a beacon of the aural type is employed, two non-continuous signals will be transmitted, such as the letter A or a dash from one antenna and the letter I or a dot from the other antenna. If radiations of this type are employed it will be seen that the non-continuous currents which will be set up in the relays 21 and 22 of Fig. 1 will cause the relays to operate or release, thereby closing the circuit through the relay 19 and disconnecting the transmitter 1 from the source of power.

Means are provided by the present invention for controlling the operation of an aural beacon to insure that the equi-signal zone established thereby maintains predetermined directional and spatial characteristics. A relay control means of this type is illustrated in Fig. 2 of the drawings and comprises the two receiving antennas 100, 101 which may be arranged locally and inductively with respect to the transmitting antennas 2, 3, and preferably respectively in the directions of maximum radiation therefrom.

If the antenna 100 is coupled to the antenna which transmits the dot or I signal, it will be apparent that current will flow in antenna 100 only during the successive short intervals of time during which the dot or I is being transmitted, and that at other alternate intervals no current will flow in antenna 100. Antenna 100 is coupled to an oxide rectifier 102, the output terminals of which supply current during the periods of transmission to the winding 103 of a relay 104. The relay 104 comprises two fixed contacts 105, 106 and a movable contact 107 which is movable into engagement with either of the fixed contacts. One fixed contact 105 is connected, through a resistance 108, to the winding 109 of a relay 110, which corresponds in function and operation to the relay 21 of Fig. 1. The second fixed contact 106 is connected through a battery 111 to the second terminal of the winding 109 of relay 110. The movable contact 107 is connected to the resistance 108 through two series-connected condensers 112, 113, the lead between which is connected to the battery 111 and relay winding 109.

In the operation of the relay control means described, the movable contact 107 is connected so that when current due to the transmission of a dot or I from antenna 2 flows in antenna 100, the movable contact 107 will be moved into engagement with fixed contact 106, thereby causing battery 111 to charge condenser 113. Upon discontinuance of the transmitted signal the movable contact 107 returns to engagement with fixed contact 105, disconnecting the battery and condenser 113 and connecting the two condensers to cause the charge on condenser 113 to be distributed between the two. At the same time the charge on the two condensers flows through relay coil 109 thereby maintaining the relay contacts in open position. The capacitances of condensers 113 and 112 and resistance 108 are so proportioned that the current flow through relay coil 109 is maintained at a sufficiently large value to hold open the contacts of relay 110 during the time elapsing between successive operations of the relay 104, that is, during the time during which the antenna is deenergized. Condenser 112 and resistor 108 are proportioned so that the current flow through relay coil 109 will be maintained during the short interval that the antenna and hence relay 104 is energized and condenser 113 is being charged by battery 111. The charge on condensers 113 and 112 is thus replenished each time the relay 104 operates.

The construction and arrangement of the second relay control means of Fig. 2 is similar to that described above, with the exception that the connections of the fixed contact members 120, 121 thereof are reversed so that when no current flows in antenna 101 during the relatively short periods between transmission of an A or dash signal, the battery 122 is connected to condenser 123 and charges the same. During reception of the A or dash signals the movable contact will engage the fixed contact 121, thereby causing the charge on condenser 123 to be distributed between the two condensers. The charges on the two condensers will simultaneously leak through the coil of relay 124 to maintain the relay contacts 125 open.

The above described system provides a means for employing alternately the non-continuous energy received from radiated dot and dash or other non-continuous characteristic signals and energy supplied by a local source to continuously operate relays. Proper adjustment of the relays and circuit constants of Fig. 2 may be made for any type of characteristic non-continuous radiated signals to insure that the relays will be continuously operated.

After proper adjustment of the relays, any variation in the character of the signals transmitted will disturb the operation of the control means described so that the relays 110 and 125 will not be continuously operated, thereby operating the relay 19 as described hereinbefore and disconnecting the transmitter 1 from the source of power. Accordingly, the control means described will insure that the fields radiated by antennas 2, 3 will maintain predetermined spatial and directional characteristics or the transmitting means radiating such fields will be de-energized.

In the event that it is desired to receive the radiated fields at a point or points distant from the source of radiations, the means disclosed in Fig. 3 of the drawings may be employed. A receiver 150 is provided, preferably at the remote point in the radiated fields, and such receiver is supplied with energy due to the radiated fields and which is collected by antenna 151. The received energy, which will be due to both radiated fields, in the event that two or more radiated fields have been established, is supplied to two electro-mechanical frequency selectors 152, 153, such as reed converters, which are respectively tuned to the radiated modulation frequencies. The outputs of the two frequency selectors are supplied respectively to two rectifiers, the oxide rectifiers 154, 155 being illustrated in the drawings. These rectifiers each supply a direct current of a strength proportional respectively to the amplitude of the received modulation frequencies, to relays 156, 157 which correspond in function to the relays 21, 22 of Fig. 1. If desired, any of the elements illustrated in Fig. 3, with the exception of the antenna and receiver, may be arranged at the remote station in the radiated fields and removed from the source of radiations. Preferably, however, the antenna and receiver only are removed from the source, the other elements being disposed at the control point and connected to the remotely disposed antenna and receiver by wires 158, 159.

It will be apparent that the monitor system illustrated in Fig. 3 will operate to control the beacon transmitters in the same manner as the system illustrated in Fig. 1. If two intersecting fields, modulated respectively by audio frequencies of 65 and 86.7 cycles are being radiated, the frequency selectors 152 and 153 will be tuned to those audio frequencies and such selectors will cause currents to flow in the relays 156, 157 which will be proportional to the amplitudes of the received audio frequencies. So long as the amplitudes of the received audio frequencies remain within predetermined limits, the currents supplied to relays 156, 157 will be proper to prevent the engagement of the movable and fixed relay contacts, thereby permitting continued operation of the transmitters establishing the radiated field which is being received. If the received modulation frequencies, and consequently the outputs of the frequency selectors and the currents in the relays vary either above or below the predetermined limits, the relays 156, 157 will be operated or released to effect the de-energization of the transmitters in the manner described in connection with Fig. 1 of the drawings.

While certain types of relays have been illustrated in the drawings and described in the specification, it will be apparent that various types may be employed without departing from the scope of the invention and that any type of relay, which will operate to perform the desired functions may be employed.

While certain forms of my invention have been described and illustrated, it will be apparent to those skilled in the art that modifications, changes, and improvements may be made in the disclosed forms without departing in any way from the spirit or scope of the invention, for the limits of which reference must be had to the appended claims.

We claim:

1. In a radio landing system, means for establishing a radiated field providing a radio path to ground having a predetermined shape and disposition, and means responsive to the intensity of said radiated field and operable in response to variation of the intensity thereof from predetermined upper and lower limits for de-energizing the means for establishing said field.

2. A radio system comprising transmitting means for establishing a radiated field in space, means for receiving said radiated field, and means constantly controlled and operated by energy received from said transmitting means and normally operable to maintain said means for establishing said field in an energized condition and operable in response to variation of the received energy from predetermined upper and lower limits for de-energizing said transmitting means.

3. In a radio landing system, means for radiating two intersecting fields defining a path in space having predetermined directional characteristics, receiving means arranged locally with respect to said radiating means and adapted to separately receive said two radiated fields, and means controlled by the current received by said receiving means from said two radiated fields and operable to de-energize said radiating means in response to variation of said received current from upper and lower predetermined limits.

4. A radio system comprising means for transmitting directively two independent characteristic modulations defining a zone of equal signal intensity providing a directional guide for a mobile receiving station and having predetermined directional characteristics, means for separately receiving and detecting said two characteristic modulations to provide two currents which are respectively proportional to the amplitudes of said two characteristic modulations, and means controlled by said two currents and normally operable to maintain said transmitting means in energized condition and operable in response to variation of either of said two currents from predetermined upper and lower limits for de-energizing said transmitting means.

5. In a radio landing system comprising transmitting means adapted to radiate a field defining a line of constant field intensity in space providing a path to ground, means for receiving and detecting said radiated field to provide a current which is proportional to the strength of said radiated field, and means controlled by said current and normally operable to maintain said transmitting means in energized condition and operable to de-energize said transmitting means in response to variation of said current from predetermined upper and lower limits.

6. A radio landing system comprising transmitting means for radiating a field in space having predetermined characteristics, means for indicating when said transmitter is operating, means for receiving said radiated field to provide a received current, means operable by said current to de-energize said transmitting means in response to variation of said received current from predetermined upper and lower limits, and means controlled by said de-energizing means for de-energizing said indicating means and for indicating that said transmitting means is not operating.

7. A radio system comprising means for transmitting directively two independent characteristic modulations, means for receiving said modulations to provide two received currents each being respectively proportional to the amplitude of one of said radiated modulations, a source of power and relay means controlling the connection of said transmitting means to said source of power, a plurality of relay means controlled by said received currents, each of said plurality of means being connected to control the operation of said first-named relay means to cause said first-named relay means to disconnect said transmitting means from said source of power in response to variation of said received currents from predetermined upper and lower limits.

8. A control means for a radio transmitting system comprising a plurality of radiating means establishing a plurality of fields which co-operate in space to produce a path having predetermined directional characteristics, means arranged locally with respect to each of said radiating means and capacitatively coupled thereto for separately receiving said radiated fields to provide a plurality of currents each of which is proportional in strength to one of said radiated fields, a source of power, means responsive to said separate currents and normally operated thereby to maintain electrical connection between said source of power and said radiating means, and means responsive to variation of either of said separate currents from pre-determined limits for disconnecting said radiating means from said source of power.

9. A radio system comprising means for radiating a directional field having impressed thereon characteristic non-continuous signals, means for receiving said signals, means for employing the received energy due to said signals for operating a relay and for storing electric energy, and means operable during discontinuance of said signals for operating said relay by means of the stored energy, and means controlled by said relay for normally maintaining the energization of said radiating means and operable upon variation of said received energy above or below predetermined limits for de-energizing said radiating means.

10. A control means for a radio transmitting system comprising means for radiating a directional field having impressed thereon a characteristic non-continuous signal, means for receiving said signal, a circuit for storing electric energy, a source of power, means controlled by energy from said storage circuit and normally operable thereby to maintain said radiating means connected to said source of power, means operable in response to the reception of said signals during periods when said signal is radiated for supplying electric energy to said storage circuit to replenish energy drawn therefrom, and means operable in response to variation of the current in said receiving means from a pre-determined limit for disconnecting said radiating means from said source of power.

11. A radio system comprising two antennas, means for supplying said antennas with currents at radio frequency to thereby establish radiation fields about said antennas, separate means disposed in receiving relation with respect to each of said antennas for receiving said radiation fields, means for producing from radiations received by said separate means two currents which are respectively proportional to the currents flowing in said antennas, and means controlled by said currents and operable to de-energize said antennas in response to variation of either of said currents from pre-determined upper and lower limits.

12. A radio system comprising means for establishing a plurality of intersecting radiated fields, means arranged within each of said radiated fields and adapted to separately receive said radiations, rectifying means for producing from each of the received radiations a current from which the carrier component of the received radiation has been eliminated and which consists of the modulation frequency impressed on the carrier in said field, other rectifying means for producing from each of said currents a current from which the modulation frequency has been eliminated and which is proportional in strength to the amplitude of the modulation frequency impressed upon the carrier radiated in the respective radiated field, and means controlled by said last-named currents and operable in response to variation of either of said last-named currents from upper and lower pre-determined limits for de-energizing said radiating means.

13. A radio system comprising transmitting means including a plurality of antennas and means for energizing said antennas to produce intersecting radiated fields having predetermined directional characteristics, a plurality of receiving means each of which is arranged in such relation to one of said antennas as to receive the radiations therefrom and is disposed in the direction of maximum radiation therefrom and is adapted to have induced therein currents proportional to the currents flowing in the associated antenna, means for producing from the currents induced in said receiving means a plurality of direct currents each of which is proportional in strength to the current flowing in one of the antennas, and means controlled by said direct currents for maintaining said transmitting means in energized condition while the strengths of said direct currents remain within predetermined limits, said last-named means being operable to de-energize said transmitting means in response to variation of either of said direct currents from pre-determined upper and lower limits.

14. A control means for a radio transmitting system comprising means for radiating a directional field having impressed thereon a characteristic non-continuous signal, means for receiving said signal, a circuit for storing electric energy, a source of power, means controlled by current from said storage circuit and normally operable thereby to maintain said radiating means connected to said source of power, means operable in response to de-energization of said receiving means for supplying electric energy to said storage circuit to replenish energy drawn therefrom, and means operable in response to variation of said received current from a pre-determined limit for disconnecting said radiating means from said source of power.

15. A control means for a radio transmitting system comprising means for radiating directional fields having alternately transmitted non-continuous signals impressed thereon and which fields overlap in space to provide an equisignal course having pre-determined directional characteristics, means for separately receiving said radiated fields, a source of power, a plurality of storage circuits, means controlled by current from said storage circuits and normally operable thereby to maintain said radiating means connected to said source of power, means operable in response to energization of one of said receiving means for supplying electric energy to one of said storage circuits for replenishing energy drawn therefrom, means operable in response to de-energization of another of said receiving means for supplying electric energy to another of said storage circuits for replenishing energy drawn therefrom, and means operable in response to variation of the current in either of said receiving means from a pre-determined limit established for each current for disconnecting said radiating means form said source of power.

16. A radio system comprising transmitting means adapted to establish two radiated fields, means connecting said transmitting means to a source of power, means arranged in receiving relation to said transmitting means and adapted to receive radiations therefrom, means for producing from the received radiations a plurality of currents which are respectively proportional to the currents in said transmitting means establishing said radiated field, and separate means each controlled by one of said currents and each being operable to operate said connecting means to disconnect said transmitting means from the source of power in response to variation from predetermined upper and lower limits of the current which controls it.

17. A radio system comprising transmitting means for establishing two radiated fields which intersect to define a path in space having predetermined directional characteristics, separate receiving means arranged locally and inductively with respect to said tranmitting means and each adapted to receive one of said radiated fields to thereby produce in each of said receiving means a current which is proportional in strength to the corresponding received radiation, and separate means each of which is controlled by the current produced in one of said receiving means and being normally operated thereby to maintain said transmitting means in energized condition and being operable thereby in response to variation of either of said radiated fields from predetermined upper and lower limits for de-energizing said transmitting means.

GERALD H. WINTERMUTE.
GOMER L. DAVIES.